Nov. 28, 1933.　　　G. SUNDBACK　　　1,937,298
WIRE SEPARABLE FASTENER
Original Filed Sept. 3, 1924　　2 Sheets-Sheet 1
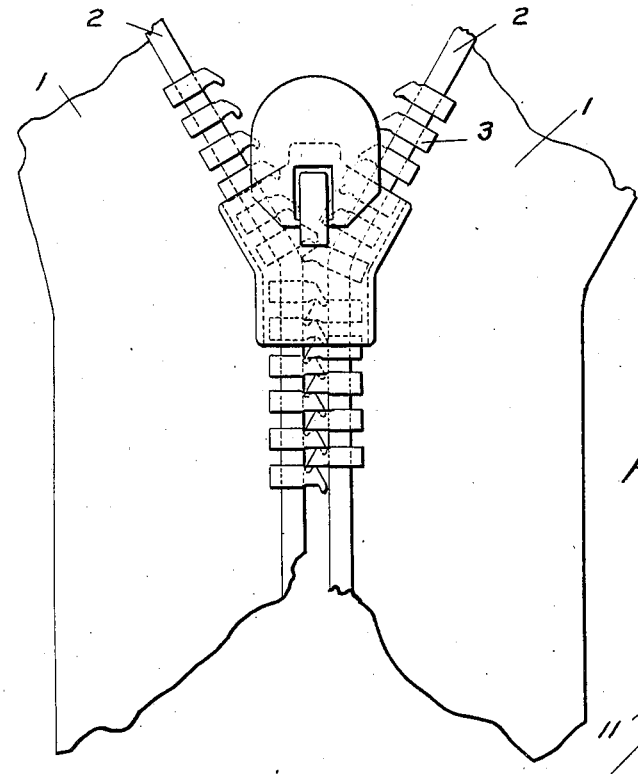
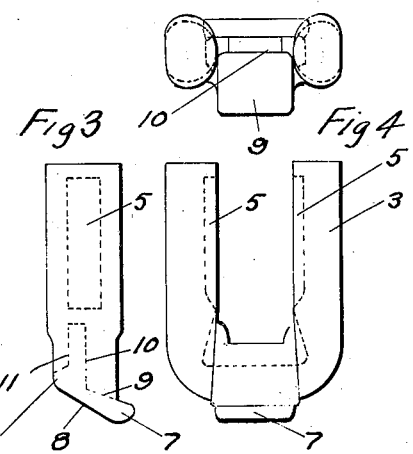
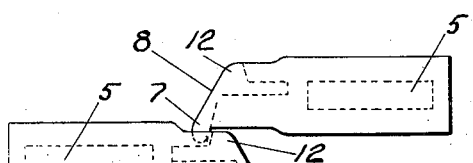
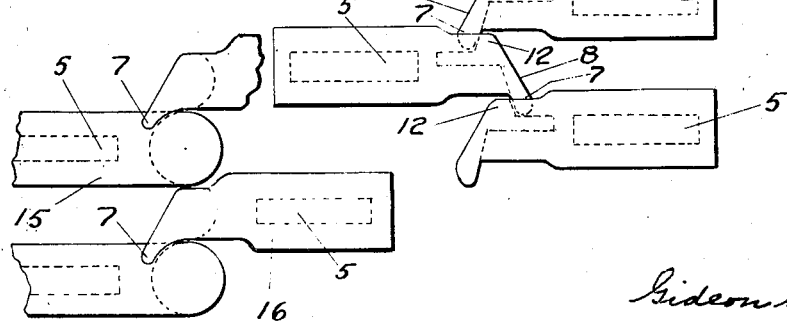
INVENTOR
Gideon Sundback
BY
ATTORNEY Nov. 28, 1933.   G. SUNDBACK   1,937,298
WIRE SEPARABLE FASTENER
Original Filed Sept. 3, 1924   2 Sheets-Sheet 2
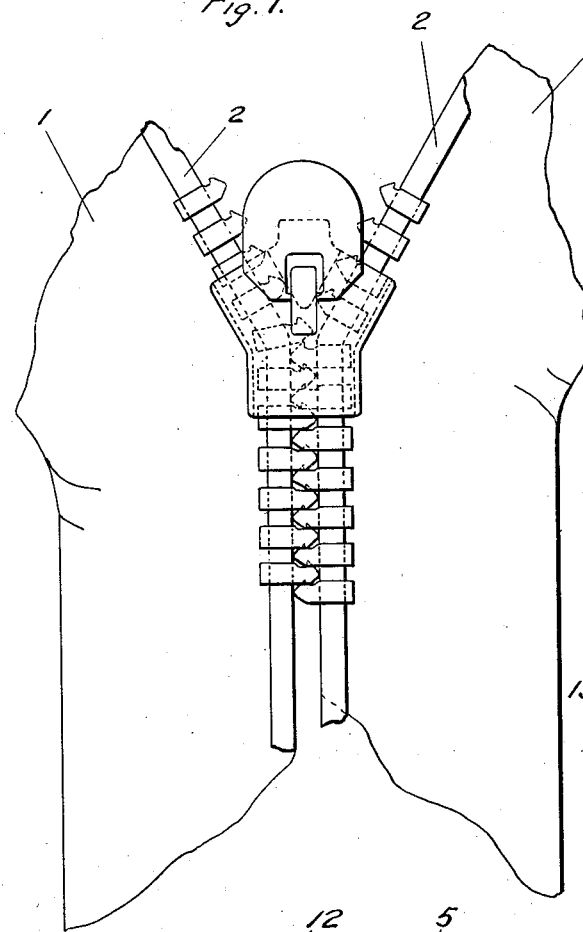
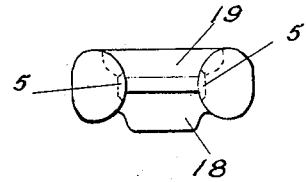
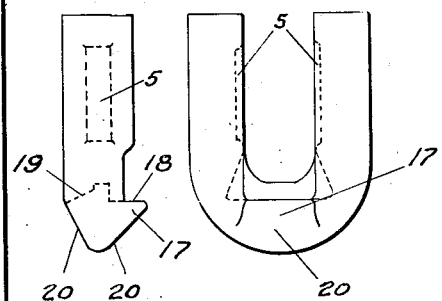
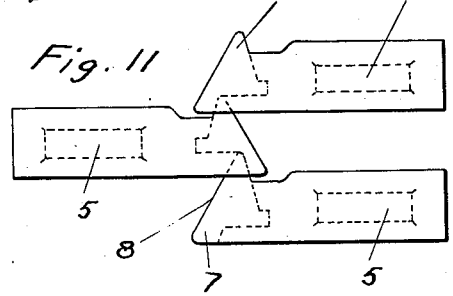
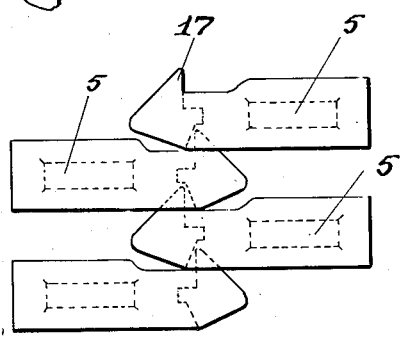
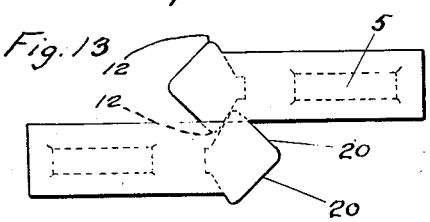
INVENTOR
Gideon Sundback
BY
ATTORNEY Patented Nov. 28, 1933

1,937,298

UNITED STATES PATENT OFFICE 1,937,298

WIRE SEPARABLE FASTENER

Gideon Sundback, Meadville, Pa., assignor to Hookless Fastener Company, Meadville, Pa., a corporation of Pennsylvania Application September 3, 1924, Serial No. 735,574
Renewed May 10, 1933

11 Claims. (Cl. 24—205)

This invention relates to separable fasteners, of the type shown in my U. S. Patent #1,219,881, dated March 20, 1917, wherein corded tape stringers carry head and socket jaw members compressed thereon, and has for its object to reduce the cost of manufacture of this type of fastener while at the same time retaining the necessary strength and lateral flexibility.

The jaw members of said patent were at first made according to the method and machine disclosed in my U. S. Patent #1,331,884, dated February 24, 1920, and later by the method and machine disclosed in my U. S. Patent #1,467,015, dated Sept. 4, 1923. In the method of the latter patent, wherein round wire is rolled by several annealing and rolling operations to Y-shape and the jaw member blanks sliced therefrom, formed and set on the tape, a substantial reduction in manufacturing cost was effected over that of the former patent, but in order to still further reduce the cost of manufacture of this type of fastener, I find it desirable to eliminate the waste of raw material incident to the method of said Patent #1,331,884 and the expense of rolling and annealing the wire incident to the method of said Patent #1,467,015. In order to accomplish this I have devised the novel jaw member forming the subject matter of this application, which is made of ordinary wire of either round or other cross section cut off to predetermined length, bent to U-shape, formed at the bend with interlocking surfaces, and formed on the legs with indentations for frictionally holding on the corded stringer. Such a jaw member differs fundamentally from that disclosed in the above mentioned patents in not being characterized by a head on one side and a socket on the other, similar to a scoop, but being characterized by utilizing the space between the bend and the edge of the stringer to receive a cooperating member on another stringer. In simplest form, the jaw member of this invention comprises a wire of predetermined length bent to U-shape and compressed on the stringer, but while members of such simple form may all be on one stringer the cooperating members on the other stringer will necessarily be of such formation as to be capable of interlocking therewith. The same condition applies if the simple U-shape members alternate on each stringer with headed members, where it is desired to have both stringers alike. The interlocking formations at the bends of these bent wire members may considerably vary, some being in general similar to arrowheads. It will be evident that the basic principle of this invention consisting of bent wire jaw members is capable of wide utilization in various specific combinations, thereby enabling fasteners to be produced of much lower cost, and as equally effective, than any heretofore known. The bent wire jaw members of this invention also readily lend themselves, when incorporated in the complete fastener, to the lateral flexibility necessary to enable the fastener when closed to be doubled on itself without disengaging or distorting the interlocking members.

In the accompanying drawings:

Figure 1 is a perspective view of a fastener embodying the invention,

Figs. 2, 3 and 4 are enlarged detail views of one form of bent wire jaw member,

Fig. 5 is an enlarged detail view showing how this form interlocks,

Fig. 6 is a modification,

Fig. 7 is a view similar to Fig. 1 showing a somewhat different formation,

Figs. 8, 9 and 10 are enlarged detail views of the jaw members of Fig. 7.

Fig. 11 is an enlarged detail view showing a modification of the jaw members of Fig. 7, Fig. 12 is an enlarged detail showing the engagement of the jaw members of Figs. 8, 9 and 10 and Fig. 13 is a detail view showing a bent wire jaw member having an arrowhead formation at the bend.

Referring to Fig. 1, 1, 1 represent tapes having corded edges 2, constituting stringers and carrying jaw members 3 thereon. These jaw members 3 are preferably formed from ordinary round wire cut off to length and bent to U-shape and then deformed in cross-section to provide the desired interlocking and tape engaging formation. Referring to Figs. 2, 3 and 4 the jaw member 3 is provided with a recess 5 on each leg to engage the corded edge of the stringer to hold the jaw member from longitudinally slipping thereon. The inner sides of the legs around the recess 5 extend into the corded edge of the tape further than the material at the bottom of the recess and thus constitute tape engaging projections. The bend is formed with a projection 7 having an exterior inclined guiding surface 8 and an interior inclined guiding surface 9 with opposite stop surfaces 10, 11, the legs being somewhat flattened as seen in Fig. 2 to reduce the overall thickness of the fastener. Between the surfaces 8 and 11 a head 12 is provided, which as seen in Fig. 5 interlocks with the projections 7 of the cooperating members on the other stringer. An essential in forming this type of jaw member from bent wire is that there be sufficient cross section of material at the bend to provide the necessary strength, and it is also essential that the interlocking surfaces be so formed as to permit the fastener to be doubled on itself without disengaging. These results are attained in all of the forms shown herein, while the cross section at the legs is such as to enable the jaw members to hold on the tape after having been compressed thereon.

In Fig. 6, jaw members 15 are simple U-shaped members with the indentations 5 for gripping the tape, while the cooperating jaw members 16 are of the hook type shown generally in Fig. 5. In connection with Fig. 6 it is not essential that the members 15, 16 be on different stringers, as they could alternate on each stringer so that both stringers would be alike as in Fig. 1.

In Figs. 7–10, and Fig. 12 a somewhat different interlocking formation at the bend is provided, consisting of a hook-like projection 17 with interior interlocking surfaces 18, 19 and exterior converging guiding surfaces 20. The interlocking surfaces 18 and 19 also constitute walls of recesses for receiving the projections of the locking members on the opposite stringer. Figs. 11 and 12 show the manner in which this type of member engages. Fig. 11 differs slightly from Fig. 12 in that the exterior guiding surface 8 of Fig. 11 is more continuous similar to 8 in Fig. 5, with the projections 12 more accentuated in Fig. 11 than in Fig. 5, and the projections 7 less accentuated.

In Fig. 13, an arrowhead form of member is disclosed wherein the guiding surfaces 20 of Fig. 9 are more or less symmetrical with projections 12 similar to Fig. 11 on both sides.

Within the scope of this invention bent wire jaw members of numerous specific designs can be made, and I do not restrict myself except as specifically required by the appended claims. Various forms of machines can be devised for making and setting these jaw members, or they can be made and set by hand. Fasteners made according to this invention are somewhat lighter than those made as heretofore stated, with equal strength and flexibility, and cost one-third, or less to produce. Lightness in a fastener of this type is essential for many uses, particularly in garments, and hence the provision of a lighter yet equally strong and flexible fastener is of decided importance in the art.

The inclination of the locking surfaces enables one member to be wedged between two members on the opposite stringer, and enables a gripping effect longitudinally of the stringer to occur, particularly on the application of lateral stress so that the members on one stringer are wedged between those on the opposite stringer, and firmly held.

I claim:

1. A fastener comprising a pair of stringers, individual separated clasp members arranged in cooperating series on said stringers, each of said members having the rear portion of its top and bottom faces parallel and the front portions of said faces inclined towards each other, in combination with a slide member having parallel faces cooperating with the parallel faces of said members.

2. A pair of stringers each including flexible material and similar locking members on both stringers, each locking member being provided with means for securing the same to the stringer and locking means spaced from the flexible material and comprising a generally U-shaped part having a locking surface in the base portion of said U-shaped part and projecting beyond said member a less distance than the thickness of said member.

3. A multiple interlocking separable fastener comprising a pair of flexible stringers, cooperating series of like interlocking members attached to adjacent edges of said stringers, said members being spaced apart on their respective stringers and the members on one stringer being staggered relative to the members on the opposite stringer so as to intermesh therewith, each of said members having a jaw end having spaced apart jaws engaging around the edge of a stringer, and an interlocking end projecting from the edge of the stringer, said interlocking end being provided with an interlocking recess on one transverse face and an interlocking projection on the opposite transverse face, said projection and recess being located about midway between the sides of the member, the sides of said element along the jaw end being substantially parallel along the interlocking end and converging toward one another whereby the transverse width is reduced, and a slider movable along said elements and having parallel channel walls adapted to cooperate with said parallel sides.

4. A multiple interlocking separable fastener comprising a pair of flexible stringers, cooperating series of like interlocking members attached to adjacent edges of said stringers, said members being spaced apart on their respective stringers and the members on one stringer being staggered relative to the members on the opposite stringer so as to intermesh therewith, each of said members having a jaw end having spaced apart jaws engaging around the edge of a stringer, and an interlocking end projecting from the edge of the stringer, said interlocking end being transversely rounded and provided with an interlocking recess on one transverse face and an interlocking projection on the opposite transverse face, said projection and recess being located about midway between the sides of the member, the sides of said element along the jaw end being substantially parallel and connected by said rounded end surface, and a slider movable along said elements and having parallel channel walls adapted to cooperate with said parallel sides.

5. A multiple interlocking separable fastener comprising a pair of flexible stringers, cooperating series of interlocking members attached to adjacent edges of said stringers, the members on one stringer being staggered relative to the members on the opposite stringer, each of said members having a recess on one side midway between the edges thereof and a projection on its opposite side midway between the edges thereof adapted to interlock respectively with a projection and recess of adjacent members on the opposite stringer, said interlocking projection being located outwardly from the edge of its stringer substantially farther than said recess.

6. A multiple interlocking separable fastener comprising a pair of flexible stringers, cooperating series of interlocking members attached to adjacent edges of said stringers, the members on one stringer being staggered relative to the members on the opposite stringer, each of said members having a recess on one side midway between the edges thereof and a projection on its opposite side midway between the edges thereof adapted to interlock respectively with a projection and recess of adjacent members on the opposite stringer, said interlocking projection being located outwardly from the edge of its stringer substantially farther than said recess, and a guiding surface sloping from the projection side of said member toward the edge of the stringer to the recessed side of the member whereby during interlocking the projection side of said member strikes said guiding surface and is guided to the recess.

7. A multiple interlocking fastener comprising a pair of flexible stringers, cooperating series of interlocking members attached to adjacent edges of said stringers, the members on one stringer being staggered relative to the members on the other stringer, the members on one stringer having interlocking projections each adapted to engage with an interlocking recess of a member on the opposite stringer, each recessed member on such opposite stringer resting upon but having no interlocking engagement with the projection carrying member next adjacent the member with which it is interlocked.

8. A multiple interlocking separable fastener comprising flexible stringers, like individual interlocking members attached to adjacent edges of said stringers and arranged thereon in staggered relation, each of said members comprising two spaced arms engaging around the edge of a stringer, said arms being connected by a yoke structure, at least one of the edge portions of said yoke structure being swaged to provide hook like projections, and the portions of said yoke structure adjacent and inward from said hook like projections being swaged to provide seats for the hook like projections of cooperating interlocking members.

9. A multiple interlocking separable fastener comprising a pair of flexible stringers, cooperating series of individual interlocking members attached to adjacent edges of said stringers, the elements on one stringer being staggered relative to the members on the other stringer so as to intermesh therewith, said members on both stringers each comprising a U-shaped structure having spaced arms engaging around the edge of a stringer for securing the members in position, and an interlocking projection and recess on opposite sides of said member at the bend and substantially midway between said arms, said member being made by bending a piece of wire of generally uniform cross section and cut to a predetermined length to U-shape, and deforming the cross section at the bend to provide said projection and recess.

10. A multiple interlocking separable fastener comprising a pair of flexible stringers, cooperating series of interlocking members attached to the adjacent edges of said stringers, the members on one stringer being staggered relative to the members on the other stringer, each of said members comprising a U-shaped structure having a pair of spaced arms engaging around the edge of a stringer for securing the member in position, and an interlocking projection extending longitudinally of the stringer edge adapted to engage in the space between the arms of a like member on the opposite stringer, each of said members being made by bending a piece of wire cut to a predetermined length and of generally uniform cross section to approximately U-shape and swaging the material adjacent said bend to form the projection.

11. A multiple interlocking separable fastener comprising a pair of flexible stringers, cooperating individual interlocking members attached to adjacent edges of said stringers, each of said members being made from straight wire bent to U-shape to provide compressible jaws and having the bend deformed to provide a projecion adapted to engage a cooperating member, said bend and jaws forming a recess to receive the projection of a cooperating member, and an exterior guiding surface terminating at said projection.

GIDEON SUNDBACK.